(12) United States Patent
Hellal et al.

(10) Patent No.: US 9,519,929 B2
(45) Date of Patent: Dec. 13, 2016

(54) METHOD AND APPARATUS FOR PROVIDING A SHOPPING LIST SERVICE

(75) Inventors: Faten "Fay" Hellal, Mountain View, CA (US); Fletcher Jones, Bethesda, MD (US); Kamal Acharya, Los Altos, CA (US); Peter Gremett, Sunnyvale, CA (US); Jai-Jen Chang, Sunnyvale, CA (US); Matthew Crampton, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 13/620,923

(22) Filed: Sep. 15, 2012

(65) Prior Publication Data

US 2013/0073425 A1    Mar. 21, 2013

Related U.S. Application Data

(63) Continuation of application No. 13/527,386, filed on Jun. 19, 2012, which is a continuation of application
(Continued)

(51) Int. Cl.
*G06Q 30/00* (2012.01)
*G06Q 30/06* (2012.01)
(Continued)

(52) U.S. Cl.
CPC ....... *G06Q 30/0633* (2013.01); *G06F 17/3005* (2013.01); *G06F 17/30112* (2013.01); *G06Q 30/02* (2013.01); *G06Q 30/0253* (2013.01); *G06Q 30/0277* (2013.01); *G06Q 30/0601* (2013.01); *G06Q 30/0617* (2013.01); *G06Q 30/0621* (2013.01); *G06Q 30/0625* (2013.01);
(Continued)

(58) Field of Classification Search
CPC ................ G06Q 30/06–30/0643; G06F 17/30; G06F 17/30002; G06F 17/3005; G06F 17/301; G06F 17/30106; G06F 17/30112; G06F 17/30861
USPC ............................................... 705/26.1–27.2
See application file for complete search history.

(56) References Cited

U.S. PATENT DOCUMENTS 5,004,270 A   4/1991  Schaul et al.
5,047,614 A   9/1991  Bianco
(Continued)

FOREIGN PATENT DOCUMENTS

EP   1194862    4/2002
WO   WO0039738  7/2000

OTHER PUBLICATIONS

Amazon web archive Oct. 12, 1999—https://web.archive.org/web/19991012135735/http:/amazon.com/exec/obidos/subst/video/sellers/amazon-top-100-video.html/ref%3Dv_tn_ts.*
(Continued)

*Primary Examiner* — William Allen
(74) *Attorney, Agent, or Firm* — Keller Jolley Preece

(57) ABSTRACT

A method and apparatus is disclosed that provides an Internet wish list for deferred purchasing. A user clicks on an add to wish list button located on locations, such as, a product page, a banner ad, or search results to add an item to the wish list. A reminder system is used to remind a user to purchase an item at a future time. The shopping list service may be integrated at a high level of integration and a low level of integration. On a low level of integration a proxy platform is used to add functionality to a website.

28 Claims, 5 Drawing Sheets

Related U.S. Application Data

No. 11/559,351, filed on Nov. 13, 2006, now Pat. No. 8,219,450, which is a continuation of application No. 10/093,641, filed on Mar. 8, 2002, now Pat. No. 7,136,829.

(51) Int. Cl.
  *G06F 17/30* (2006.01)
  *G06Q 30/02* (2012.01)

(52) U.S. Cl.
  CPC ...... *G06Q 30/0641* (2013.01); *G06Q 30/0643* (2013.01)

(56) References Cited

U.S. PATENT DOCUMENTS

| | | | |
|---|---|---|---|
| 5,361,871 A | 11/1994 | Gupta et al. | |
| 5,590,197 A | 12/1996 | Chen et al. | |
| 5,630,068 A | 5/1997 | Vela et al. | |
| 5,696,366 A | 12/1997 | Ziarno | |
| 5,754,981 A | 5/1998 | Veeneman et al. | |
| 5,774,874 A | 6/1998 | Veeneman et al. | |
| 5,870,716 A | 2/1999 | Sugiyama et al. | |
| 5,898,594 A | 4/1999 | Leason et al. | |
| 5,970,474 A | 10/1999 | LeRoy et al. | |
| 5,983,200 A | 11/1999 | Slotznick | |
| 5,999,914 A | 12/1999 | Blinn et al. | |
| 6,026,376 A | 2/2000 | Kenney | |
| 6,058,373 A | 5/2000 | Blinn et al. | |
| 6,076,091 A | 6/2000 | Fohn et al. | |
| 6,084,528 A | 7/2000 | Beach et al. | |
| 6,101,482 A | 8/2000 | DiAngelo et al. | |
| 6,370,513 B1 | 4/2002 | Kolawa et al. | |
| 6,386,450 B1 | 5/2002 | Ogasawara | |
| 6,598,026 B1 | 7/2003 | Ojha et al. | |
| 6,609,106 B1* | 8/2003 | Robertson | 705/5 |
| 6,611,814 B1 | 8/2003 | Lee et al. | |
| 6,850,917 B1 | 2/2005 | Hom et al. | |
| 6,999,941 B1 | 2/2006 | Agarwal | |
| 7,110,968 B2* | 9/2006 | Haynes et al. | 705/26.8 |
| 7,136,829 B2 | 11/2006 | Hellal | |
| 7,159,180 B2 | 1/2007 | Ward | |
| 7,162,443 B2 | 1/2007 | Shah | |
| 7,188,081 B1 | 3/2007 | Shah | |
| 7,315,834 B2 | 1/2008 | Martineau et al. | |
| 7,324,965 B2 | 1/2008 | Martineau et al. | |
| 7,343,351 B1 | 3/2008 | Bishop et al. | |
| 7,356,490 B1* | 4/2008 | Jacobi et al. | 705/26.8 |
| 7,433,832 B1 | 10/2008 | Bezos et al. | |
| 7,467,100 B2 | 12/2008 | Matsumori | |
| 7,580,861 B1 | 8/2009 | Song | |
| 7,584,210 B2 | 9/2009 | Wight et al. | |
| 7,606,736 B2 | 10/2009 | Martineau et al. | |
| 7,614,552 B2* | 11/2009 | Roseman et al. | 235/383 |
| 7,617,124 B1 | 11/2009 | Ronning et al. | |
| 7,634,428 B1 | 12/2009 | Varatharajah | |
| 7,698,167 B2 | 4/2010 | Batham et al. | |
| 7,711,611 B2 | 5/2010 | Martineau et al. | |
| 7,716,086 B2 | 5/2010 | Anderson et al. | |
| 7,925,542 B2 | 4/2011 | Shah | |
| 8,032,506 B1 | 10/2011 | Gregov et al. | |
| 8,219,450 B2 | 7/2012 | Hellal | |
| 8,671,353 B1* | 3/2014 | Varadarajan | 715/763 |
| 2001/0037259 A1 | 11/2001 | Sharma et al. | |
| 2001/0042060 A1* | 11/2001 | Rouse et al. | 707/1 |
| 2001/0049617 A1 | 12/2001 | Berenson et al. | |
| 2001/0049636 A1 | 12/2001 | Hudda et al. | |
| 2002/0026369 A1 | 2/2002 | Miller et al. | |
| 2002/0026386 A1 | 2/2002 | Walden | |
| 2002/0111853 A1* | 8/2002 | O'Ryan | 705/14 |
| 2002/0156685 A1* | 10/2002 | Ehrlich et al. | 705/26 |
| 2002/0186255 A1 | 12/2002 | Shafron et al. | |
| 2003/0074265 A1 | 4/2003 | Oshima | |
| 2003/0115549 A1 | 6/2003 | Ward | |
| 2003/0120646 A1* | 6/2003 | Littlefield et al. | 707/3 |
| 2003/0145277 A1* | 7/2003 | Neal et al. | 715/509 |
| 2003/0163399 A1 | 8/2003 | Harper et al. | |
| 2004/0078294 A1* | 4/2004 | Rollins et al. | 705/27 |
| 2004/0083111 A1* | 4/2004 | Rehbein et al. | 705/1 |
| 2005/0197927 A1 | 9/2005 | Martineau et al. | |
| 2006/0206563 A1 | 9/2006 | Van De Sluis | |
| 2012/0259700 A1 | 10/2012 | Hellal | |
| 2013/0066743 A1 | 3/2013 | Hellal | |
| 2013/0198033 A1 | 8/2013 | Hellal | |
| 2013/0204679 A1 | 8/2013 | Hellal | |

OTHER PUBLICATIONS

"Making a List . . . and checking the sites; it's easier than ever to tell Santa what you want for Christmas by Posting your own on-line Holiday wish Lists"; Elizabeth Owens; Dec. 23, 1999.
U.S. Appl. No. 10/093,641, Aug. 1, 2005, Office Action.
U.S. Appl. No. 10/093,641, Jan. 10, 2006, Office Action.
U.S. Appl. No. 10/093,641, Jul. 6, 2006, Notice of Allowance.
U.S. Appl. No. 11/559,351, May 26, 2010, Office Action.
U.S. Appl. No. 11/559,351, Nov. 12, 2010, Office Action.
U.S. Appl. No. 11/559,351, Jun. 23, 2011, Office Action.
U.S. Appl. No. 11/559,351, Nov. 28, 2011, Office Action.
U.S. Appl. No. 11/559,351, Mar. 12, 2012, Notice of Allowance.
U.S. Appl. No. 13/527,386, Oct. 1, 2012, Office Action.
U.S. Appl. No. 13/527,386, Jul. 2, 2013, Office Action.
U.S. Appl. No. 13/527,386, Nov. 12, 2013, Office Action.
U.S. Appl. No. 13/620,510, Mar. 1, 2013, Office Action.
U.S. Appl. No. 13/620,510, Sep. 25, 2013, Office Action.
U.S. Appl. No. 13/801,652, Aug. 27, 2013, Office Action.
U.S. Appl. No. 13/827,146, Aug. 27, 2013, Office Action.
Amazon web archive Oct. 12, 1999, https://web.archive.org/web/19991012180636/http://amazon.com/exec/obidos/shopping-basket.
U.S. Appl. No. 13/527,386, Mar. 28, 2014, Office Action.
U.S. Appl. No. 13/620,510, Feb. 14, 2014, Office Action.
U.S. Appl. No. 13/801,652, Feb. 10, 2014, Office Action.
U.S. Appl. No. 13/827,146, May 8, 2014, Office Action.
Rose Marie Tondl et al. "Shopping Smart Consumers and Clothing Purchases" Nebraska Cooperative Extension Service 4-H173, (1985).
Gaffin, Adam. Take a walk on the Web site. Network World 12.19 (May 8, 1995): 57. Downloaded from ProQuestDirect on the Internet on Jul. 26, 2015, 4 pages.
U.S. Appl. No. 13/527,386, Jul. 23, 2015, Office Action.
U.S. Appl. No. 13/620,510, Jun. 11, 2015, Office Action.
U.S. Appl. No. 13/827,146, Jul. 31, 2015, Office Action.
U.S. Appl. No. 13/527,386, Jun. 20, 2014, Office Action.
U.S. Appl. No. 13/527,386, Dec. 12, 2014, Office Action.
U.S. Appl. No. 13/620,510, Nov. 7, 2014, Office Action.
U.S. Appl. No. 13/827,146, Jan. 15, 2015, Office Action.
U.S. Appl. No. 13/527,386, Aug. 8, 2016, Office Action.
U.S. Appl. No. 13/620,510, Sep. 16, 2016, Office Action.

\* cited by examiner

MEAT LOAF

A hearty family meal, susceptible to many variations. The second day, slice it thin and make sandwiches on rye bread with sweet pickles.

Add to wish list
☐ 2 cups freshly made <u>bread crumbs</u>
☐ 1 onion, chopped fine
☐ 2 eggs, slightly beaten
☐ 2 pounds ground beef
☐ 2 tablespoons Worcestershire sauce
☐ 1 1/2 teaspoons dry mustard
☐ 1 1/2 teaspoons salt
☐ 1/2 teaspoon freshly ground pepper
☐ 1/4 cup milk

410

[ Add All ] — 420

Preheat the oven to 350°F. Butter a loaf pan. Combine all the ingredients in a large bowl; your freshly washed hands are the best tools for the job. Pat into the loaf pan and bake for 45 minutes.

July 2001

| Monday | Tuesday | Wednesday | Thursday | Friday | Sat/Sun |
|--------|---------|-----------|----------|--------|---------|
|        |         |           |          |        | July 1  |
| 2      | 3       | 4         | 5        | 6      | 7       |
|        |         |           |          |        | 8       |
| 9      | 10      | 11<br>-Call Lofe<br>-Anniversary<br>-Buy DVD | 12 | 13 | 14 |
|        |         |           |          |        | 15      |
| 16     | 17      | 18        | 19       | 20     | 21      |
|        |         |           |          |        | 22      |
| 23     | 24      | 25        | 26       | 27     | 28      |
|        |         |           |          |        | 29      |
| 30     | 31      |           |          |        |         |

*FIG. 5*

METHOD AND APPARATUS FOR PROVIDING A SHOPPING LIST SERVICE

CROSS REFERENCE TO RELATED APPLICATIONS

The present application is a continuation of U.S. patent application Ser. No. 13/527,386, filed on Jun. 19, 2012, which is a continuation of U.S. patent application Ser. No. 11/559,351, filed on Nov. 13, 2006 now issued as U.S. Pat. No. 8,219,450, which is a continuation of U.S. patent application Ser. No. 10/093,641, filed Mar. 8, 2002 now issued as U.S. Pat. No. 7,136,829. Each of the aforementioned patent(s) and application(s) are hereby incorporated by reference in their entirety.

TECHNICAL FIELD

The invention relates generally to providing a shopping service on the Internet and, more particularly, is directed to a system for retaining shopping selections from a multitude of websites in a location from which the shopping selections can be later accessed.

DESCRIPTION OF THE PRIOR ART

Throughout the history of man, there has been the desire to acquire possessions. At the early point of man's existence, the main focus was acquiring such necessities as food and water. As man has developed over the eons, the constant drive to possess necessities has evolved to possessing non-necessities such as big screen TV's and cellular phones. One method for acquiring such non-necessities has been the shopping list. Typically a shopping list is created by a person walking through a mall, finding things that they like, and physically writing them down onto a piece of paper.

As time has passed, online or Internet shopping has become increasingly popular. Unfortunately, the development of shopping lists has not yet accompanied the development of the Internet. Currently, while online shopping lists exist, they only work on a single website. This requires a person who typically shops from many websites, to have multiple shopping lists, one from each website. Also, current Internet shopping lists do not allow a user to add items to his shopping list from a search result. And also, current shopping list systems must be highly integrated with a shopping website for the shopping list and the website to function together.

What is needed is a shopping list that works with many shopping websites. What is needed is a shopping list that can add an item from a search result. What is needed is a shopping list that can add an item from a website that is not highly integrated with the shopping list system.

SUMMARY OF THE INVENTION

A method and apparatus is disclosed that provides a shopping list service such as a wish list for deferred purchasing. The shopping list comprises information, such as the name of the item, a brief description of the item, the date the item was added to the list, and a link to a product page for the item.

To add an item to the shopping list, a user clicks on an add to wish list button located on web locations such as, a product page, a banner ad, or search results. When a user views his shopping list he performs such functions as, viewing the items on the list, removing items from the list, linking to a product page and purchasing the item.

A reminder system is used to remind a user to purchase an item at a future time. The shopping list service is integrated in such ways as, a high level of integration and a low level of integration. When integrated at a low level, a proxy platform is used to add buttons, such as, a buy button and an add to wish list button. The proxy platform is an intermediate website with which the shopping website is viewed.

BRIEF DESCRIPTION OF THE DRAWINGS

FIG. 4 is a diagram illustrating a recipe with an add all button according to the present invention; and FIG. 5 is a diagram illustrating a reminder page according to the present invention.

DESCRIPTION OF THE PREFERRED EMBODIMENT

Figure 1A:
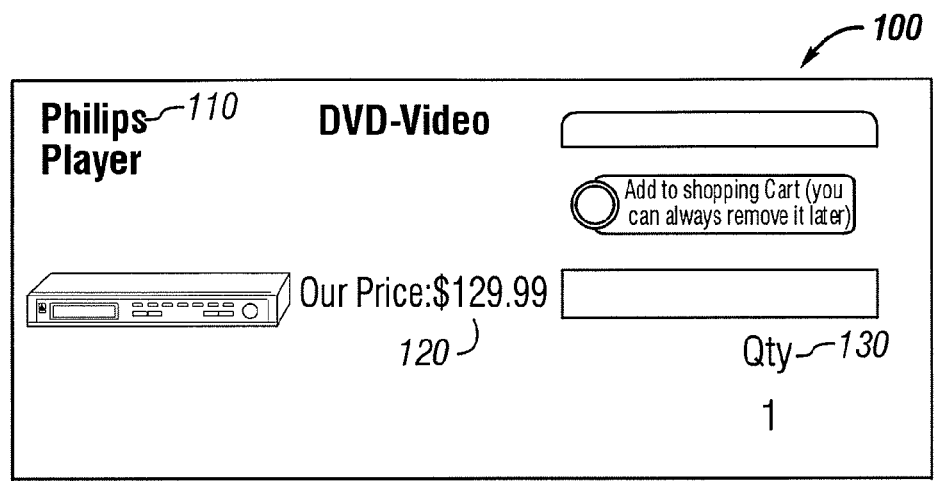
FIGS. 1A and 1B are diagrams illustrating a website product page with and without an add to wish list button according to the invention.

FIG. 1A illustrates a typical shopping website page 100. The website sells DVD players. The website page displays the name of the DVD player 110, the price 120 and the quantity selected 130.

Figure 1B:
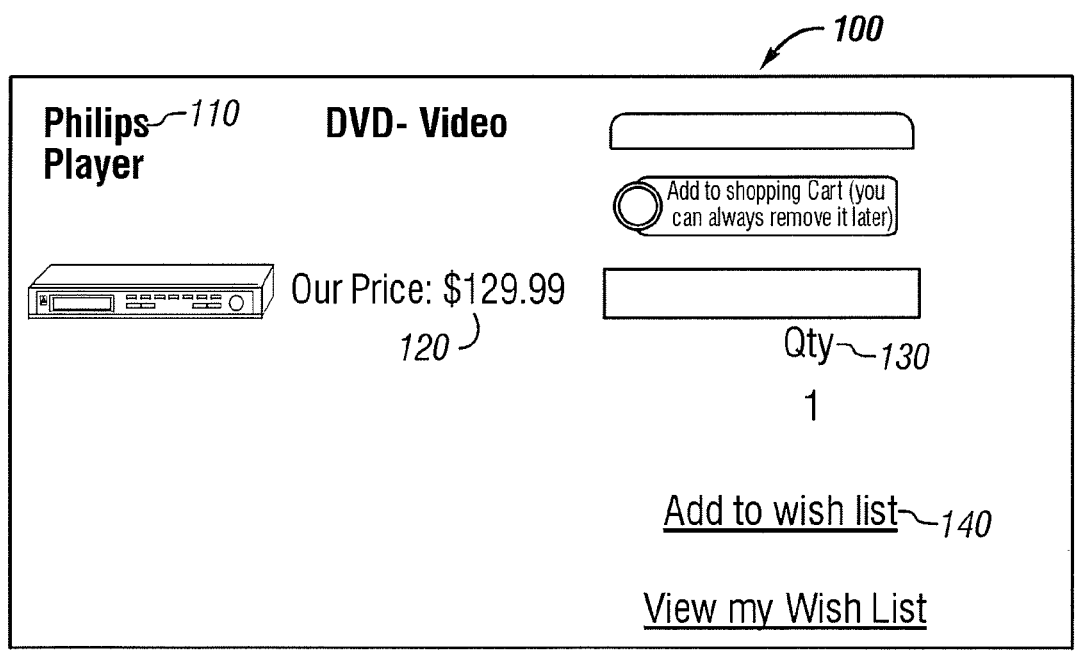

FIG. 1B illustrates the same web page with an Add to Wish List button 140. Activation of the Add to Wish List button 140 adds the product to the user's shopping/wish list.

Figure 2:
FIG. 2 is a diagram illustrating a wish list web page according to the invention.

FIG. 2 illustrates a preferred embodiment of the wish list 200. The wish list 200 records item and web page information, more particularly, purchase information, so that a user can track the selected products. The wish list records the product name 210, URL 220, price 230, manufacturer 240, and the date 250 that the product was added to the wish list. The shopping/wish list system automatically checks the URL on a routine basis to ensure that it is still valid. A user purchases the item by pressing the add to shopping cart button 260 on the wish list page. A user also views items similar to the items on his wish list by selecting the See more items like those in you Wish List button 285. A user accesses the wish list either by logging on through a login site or by automatically being logged on through an Internet service provider such as AOL produced by America Online Inc. of Vienna, Va.

In a preferred embodiment, URL information for website items are tracked by correlating the URL for a product to the product's stock keeping unit (SKU). Each product or item has a unique SKU number. The SKU number does not change. However, URL's often change. As pages are changed, so are the products' URL's. Using the SKU as an intermediate reference allows a validation process to point to the current URL from the SKU. When the wish list system checks a website to see if a URL is valid, it reads the SKU value of the item, then reads the corresponding URL listed by the website, and checks the URL value with the URL kept by the shopping list system. If the URL values match, then the URL is valid. If the URL's do not match, then it is not valid.

Figure 3:
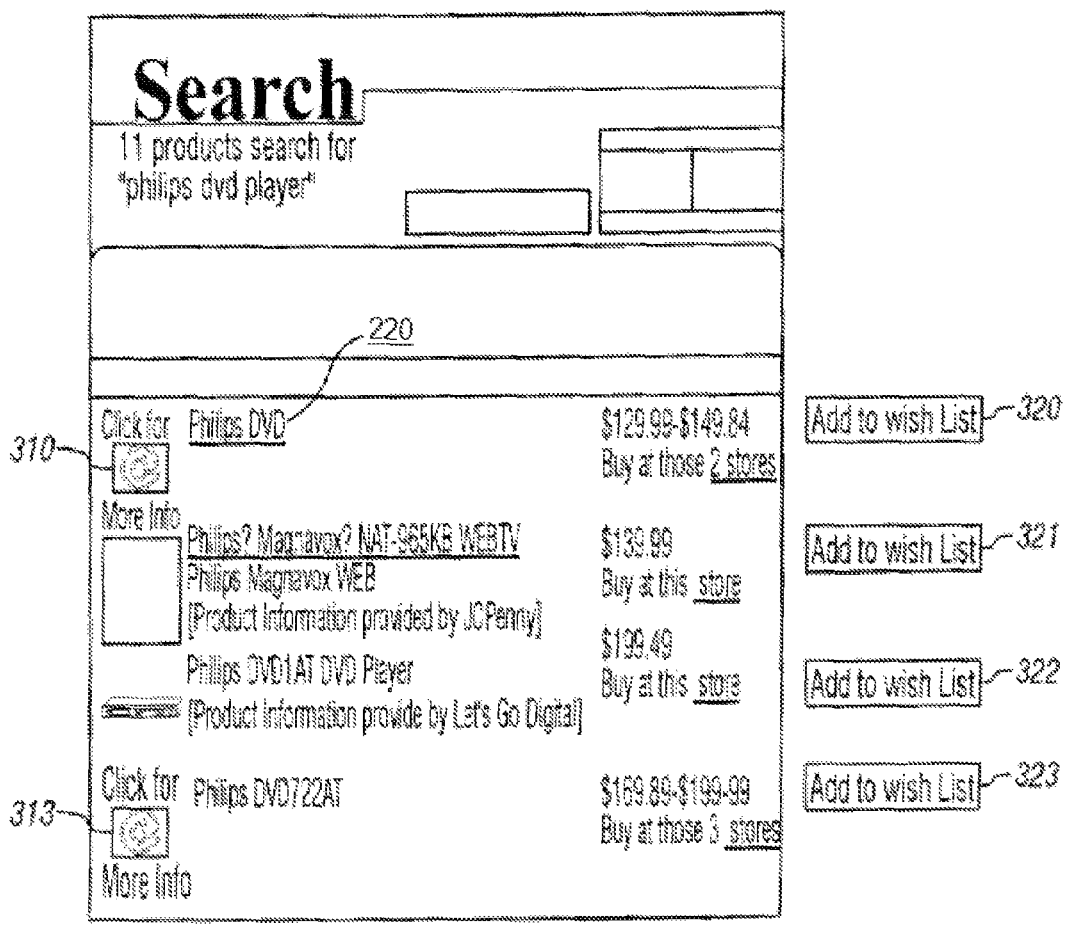
FIG. 3 is a diagram illustrating a search result that contains add to wish list buttons according to the present invention.

An item is added to the wish list by several other methods. One such method is by pressing an Add to Wish List button located next to an item listed in a search result. FIG. 3 illustrates the search results for a DVD player. Beside each listed DVD player is an Add to Wish List button 320, 321, 322, 323. Pressing of the button 320, 321, 322, 323 adds the corresponding item to the wish list. For each DVD player offered for sale at multiple stores, a clickable element "click for more info" 310, 313 is presented. Search results are obtained from multiple merchants who are part of the wish list system. Other methods of adding items to the wish list include pressing an add to wish list button located on, a banner ad, a decision guide, a promotional browser window, a personal shopper's toolbar and a product page. Items are removed from the wish list by selecting the item and pressing the delete button 270. A user can also save search results onto his wish list.

Promotions such as coupons are typically offered through a promotional browser window that pops up when a user views his wish list. The coupons typically relate to items on the user's wish list. The coupons are offered for a limited time.

FIG. 4 illustrates a web page 400 listing the items 410 for a recipe. A user saves all the items 410 on the recipe by pressing the Add All button 420. Add all buttons are provided where it is likely that a user will purchase many related items at once. Examples are, but not limited to, recipes, pieces of gym equipment, a book series and computer parts.

The user has the option to name his wish list. Typically the name of wish lists relates to events, such as, weddings, birthdays, and anniversaries. These lists can be merged to create a single list. Also, the wish lists of multiple users can be merged together.

Once a wish list is accessed, the user has multiple options. One such option is clicking on a wish list item link 220 to access the item's product page 100. Another such option is that he purchases the item from the wish list page by activating a buy button or begins the process of purchasing the item by pressing the Add to cart button 260.

A user shares his wish list with others by several ways. One such way is to make the wish list accessible through the user's profile. The wish list is accessible by another person while viewing the user's profile. In a preferred embodiment, the user's profile is accessed by typing in the user's screen name in a user search window available through the wish list service host. The user has the option to preclude others from searching through his wish list. Also, the user can set up a password step that a potential wish list viewer must enter before he views the wish list.

Alternatively, the user shares his wish list by emailing a link to the wish list. The email provides a link to the user's profile and/or wish list, where the email recipient then views it.

In a preferred embodiment, the buy button and/or shopping cart purchase system is linked to a cyber wallet. A cyber wallet typically resides on a client computer system, and performs financial transactions, such as purchases, by communicating with a server application on a server computer system. For example, a user on a client computer system decides to purchase software from a server computer system that belongs to a software vendor. Protocols such as the Secure Electronic Transactions (SET) protocol and the Open Trading Protocol (OTP) enable the server computer system to receive a payment for the software from a cyber wallet on the client computer system. Using these protocols, this payment is automatically deducted from an account linked to the cyber wallet on the client computer system, and is automatically credited to an account linked to an application on the server computer system.

The wish list system keeps statistical data on the items saved on the wish list. The statistical data kept is, but not limited to, number of users creating wish lists, average number of products added per wish list, total number of products wished for, average number of products wished for per list, the link which led to the creation of the wish list, number of click-throughs generated by the wish list, number of public lists, number of shared lists, average number of recipients per shared list, number of guest viewers of all wish lists, number of removed products per list, number of purged lists, top twenty most popular products, number of anonymous wish lists created, number of anonymous wish lists saved, and the number of Jot-It-Down buttons. An anonymous wish list is a wish list for a user choosing to sign into an associated user registration process anonymously, whereby such wish list may be kept for a temporary amount of time, such as, for example, thirty days. A Jot-It-Down button is a button linking to a Jot-It-Down feature within the user's wish list. Such feature allows the user to enter a description is and a date and a time for when to check the wish list, and, optionally create an associated link in the user's calendar for such date and time back to the wish list.

FIG. 5 illustrates a calendar system 500 that enables a user to set future reminders. A user selects a date 510 and then enters information 520 that will be used to remind him at a later time. Such information includes, but is not limited to, anniversaries, birthdays, and when to purchase a product. A user is able to configure the calendar to automatically purchase an item on the user's wish list on a future date. The item is automatically purchased by receiving information from the user's cyber wallet. Price-based alerts remind the user to purchase a product if the product should equal or fall below a designated price.

In another embodiment, the buy and add to wish list buttons are added to a website that is not highly integrated. Typically, a high level of integration is required between a website and a cyber wallet provider and/or a cyber mall to add functions such as, a buy and add a wish list button. A proxy platform adds these buttons with a low level of integration. The proxy is described in the co-pending U.S. patent application Ser. No. 10/017,662, Proxy Platform Integration System (filed Dec. 14, 2001) and is commonly assigned to Netscape Communications, Inc. of Mountain View, Calif., which application is incorporated herein in its entirety by this reference thereto.

The proxy platform acts as an intermediate website that alters the appearance of another website. A user views the website through the proxy. The proxy platform adds, removes or rearranges elements on the website. The proxy platform adds functional elements such as a button that interacts with the website. To the user, the integration of the website and the proxy platform is seamless, such that the user believes what he is seeing is an unaltered website.

A buy button on the proxy platform provides automatic form filling by accessing the user's cyber wallet and relaying purchase information to a merchant website. Each piece of information is designated properly and entered onto the merchant's purchase form. The add to wish list button adds items to the user's wish list.

A proxy platform is created by parsing a website, and mapping the elements of the website. Rules are created that designate how the elements of the website are to be manipulated. For example, in addition to manipulating the website by adding and removing elements, web elements can be manipulated by moving them around the page such that the layout of the web elements are different than the original.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus comprising:
   at least one processor; and
   a non-transitory computer readable medium storing instructions that, when executed by the at least one processor, cause the apparatus to:
   maintain a list associated with a user, wherein the list comprises one or more items in which the user is interested;
   providing, in response to a search query, a presentation of a plurality of search results within a graphical user interface;
   provide, within the graphical user interface and for each search result from the plurality of search results, an option to add the search result to the list associated with the user;
   provide, within the graphical user interface and for each search result from the plurality of search results, an option for purchasing an item associated with the search result;
   for each search result that has multiple third-party offers for sale, display, within the graphical user interface, only a title of the search result and a clickable element to more information for the search result;
   for each search result that has only a single third-party offer for sale, display, within the graphical user interface, a title of the search result and additional information for the search result, wherein the additional information is non-pricing information;
   detect a selection by the user of a particular option to add a particular search result from the plurality of search results to the list; and
   update, in response to the detected selection, the list to include an item associated with the particular search result.

2. The apparatus of claim 1, wherein the instructions, when executed by the at least one processor, further cause the apparatus to:
   enable an option for the user to access additional results that are similar to the plurality of search results;
   detect a user selection of the option to access additional results; and
   enable presentation of the additional results to the user.

3. The apparatus of claim 1, wherein the particular option comprises a selectable user interface element.

4. The apparatus of claim 3, wherein the selectable user interface element comprises a selectable button.

5. The apparatus of claim 3, wherein the selectable user interface element includes or is accompanied by a message instructing the user to select the selectable user interface element if the user desires to add the item associated with the particular search result to the list.

6. The apparatus of claim 5, wherein the message comprises the text "add to" and "list".

7. The apparatus of claim 3, further comprising instructions that, when executed by the at least one processor, cause the apparatus to:
   identify whether a particular search result from the plurality of search results has a plurality of different prices;
   display, within the graphical user interface and in response to identifying that the particular search result has a plurality of different prices, an upper limit associated with a highest price for the particular search result and a lower limit associated with a lowest price for the particular search result; and
   display, within the graphical user interface and in response to identifying that the particular search result has only a single price, the single price for the particular search result.

8. The apparatus of claim 1, wherein the group of search results represents at least one of a plurality of pieces of related equipment, a plurality of books in a series, or a plurality of ingredients in a recipe.

9. The apparatus of claim 1, wherein the instructions, when executed by the at least one processor, further cause the apparatus to provide, within the graphical user interface and for each search result from the plurality of search results, a range of prices for purchasing the item from one or more third parties.

10. The apparatus of claim 1, wherein, for each search result from the plurality of search results, the option for purchasing the item comprises a link to access information for one or more third parties offering the item for sale.

11. The apparatus of claim 10, wherein the link specifies a number of third parties offering the item for sale.

12. A system comprising:
    at least one processor; and
    at least one non-transitory computer readable storage medium storing instructions thereon that, when executed by the at least on a processor, cause the system to:
    maintain a list associated with a user, wherein the list comprises one or more items in which the user is interested;
    provide, in response to a search query, a presentation of a plurality of search results within a graphical user interface;
    provide, within the graphical user interface and for each search result from the plurality of search results, an option to add the search result to the list associated with the user;
    provide, within the graphical user interface and for each search result from the plurality of search results, an option for purchasing an item associated with the search result;
    for each search result that has multiple third-party offers for sale, display, within the graphical user interface, only a title of the search result and a clickable element to more information for the search result;
    for each search result that has only a single third-party offer for sale, display, within the graphical user interface, a title of the search result and additional information for the search result, wherein the additional information is non-pricing information;
    detect, using at least one processor, a selection by the user of a particular option to add a particular search result from the plurality of search results to the list; and
    update, in response to the detected selection, the list to include an item associated with the particular search result.

13. The system of claim 12, further comprising instructions thereon that, when executed by at least one processor, cause the system to:
    enable an option for the user to access additional results that are similar to the plurality of search results;

detect a user selection of the option to access additional results; and enable presentation of the additional results to the user.

14. The system of claim 12, wherein the particular option comprises a selectable user interface element.

15. The system of claim 14, wherein the selectable user interface element comprises a selectable button.

16. The system of claim 4, wherein the selectable user interface element includes or is accompanied by a message instructing the user to select the selectable user interface element if the user desires to add the item associated with the particular search result to the list.

17. The system of claim 16, wherein the message comprises the text "add to" and "list".

18. The system of claim 14, further comprising instructions thereon that, when executed by at least one processor, cause the system to:

identify whether a particular search result from the plurality of search results has a plurality of different prices;

display, within the graphical user interface and in response to identifying that the particular search result has a plurality of different prices, an upper limit associated with a highest price for the particular search result and a lower limit associated with a lowest price for the particular search result; and display, within the graphical user interface and in response to identifying that the particular search result has only a single price, the single price for the particular search result.

19. The system of claim 12, wherein the selectable user interface element comprises a link.

20. The system of claim 12, wherein the group of search results represents a plurality of pieces of related equipment.

21. The system of claim 12, wherein the group of search results represents a plurality of books in a series.

22. The system of claim 12, wherein the group of search results represents a plurality of ingredients in a recipe.

23. A method comprising:

maintaining a list associated with a user, wherein the list comprises one or more items in which the user is interested;

providing, in response to a search query, a presentation of a plurality of search results and within a graphical user interface;

for each of the plurality of search results, automatically providing, within the graphical user interface, an option to add a corresponding search result from the plurality of search results to the list;

providing, within the graphical user interface and for each search result from the plurality of search results, an option for purchasing an item associated with the search result;

for each search result that has multiple third-party offers for sale, displaying, within the graphical user interface, only a title of the search result and a clickable to more information for the search result;

for each search result that has only a single third-party offer for sale, displaying, within the graphical user interface, a title of the search result and additional information for the search result, wherein the additional information is non-pricing information;

detecting, using at least one processor, a request to add one or more search results to the list; and updating, in response to the detected request, the list to include the one or more search results.

24. The method of claim 23, wherein the option comprises a selectable user interface element.

25. The method of claim 24, further comprising:

identifying whether a particular search result from the plurality of search results has a plurality of different prices;

displaying, within the graphical user interface and in response to identifying that the particular search result has a plurality of different prices, an upper limit associated with a highest price for the particular search result and a lower limit associated with a lowest price for the particular search result; and displaying, within the graphical user interface and in response to identifying that the particular search result has only a single price, the single price for the particular search result.

26. The method of claim 24, wherein the selectable user interface element comprises a selectable button.

27. The method of claim 24, wherein the selectable user interface element includes or is accompanied by a message instructing the user to select the selectable user interface element if the user desires to add the item associated with the particular search result to the list.

28. The method of claim 27, wherein the message comprises the text "add to" and "list".

* * * * *